United States Patent [19]

Caputo et al.

[11] Patent Number: 4,840,270
[45] Date of Patent: Jun. 20, 1989

[54] RE-SEALABLE LABEL FLAP

[75] Inventors: Garry L. Caputo, Rutherford, N.J.; Thomas A. Saldarelli; William E. Dwan, both of Yorktown Heights, N.Y.

[73] Assignee: Nice-Pak Products, Inc., Orangeburg, N.Y.

[21] Appl. No.: 135,940

[22] Filed: Dec. 21, 1987

[51] Int. Cl.$^4$ ............................................. B65D 81/24
[52] U.S. Cl. ......................... 206/205; 206/449; 206/607; 206/613; 206/621; 206/629; 206/812; 206/652; 220/258
[58] Field of Search ................ 220/258; 206/449, 607, 206/813, 494, 555, 613, 629, 621, 631, 632, 633, 205, 812, 813

[56] References Cited

U.S. PATENT DOCUMENTS 3,951,331 4/1976 Smith et al. ........................ 220/258
4,192,420 3/1980 Worrell, Sr. et al. .............. 220/258
4,420,080 12/1983 Nakamura ........................... 220/258
4,673,126 6/1987 Hambleton ......................... 220/258

Primary Examiner—Joseph Man-Fu Moy
Attorney, Agent, or Firm—Darby & Darby

[57] ABSTRACT

A method for producing a label stopping area on a semirigid or flexible package having a package portion with an opening and a label flap which covers the opening. The label stopping area is such that the label flap can be lifted away from the package opening but not completely removed from the package body. The method involves treating a specific area of the package body's surface with a corona discharge so that the adhesion characteristics of the treated areas are improved. After the application of a pressure sensitive label flap, the label flap can be peeled easily up to the corona treated zone whereafter the label flap adhesion is substantially greater, thereby preventing inadvertent complete removal of the label flap from the package when opening.

5 Claims, 2 Drawing Sheets

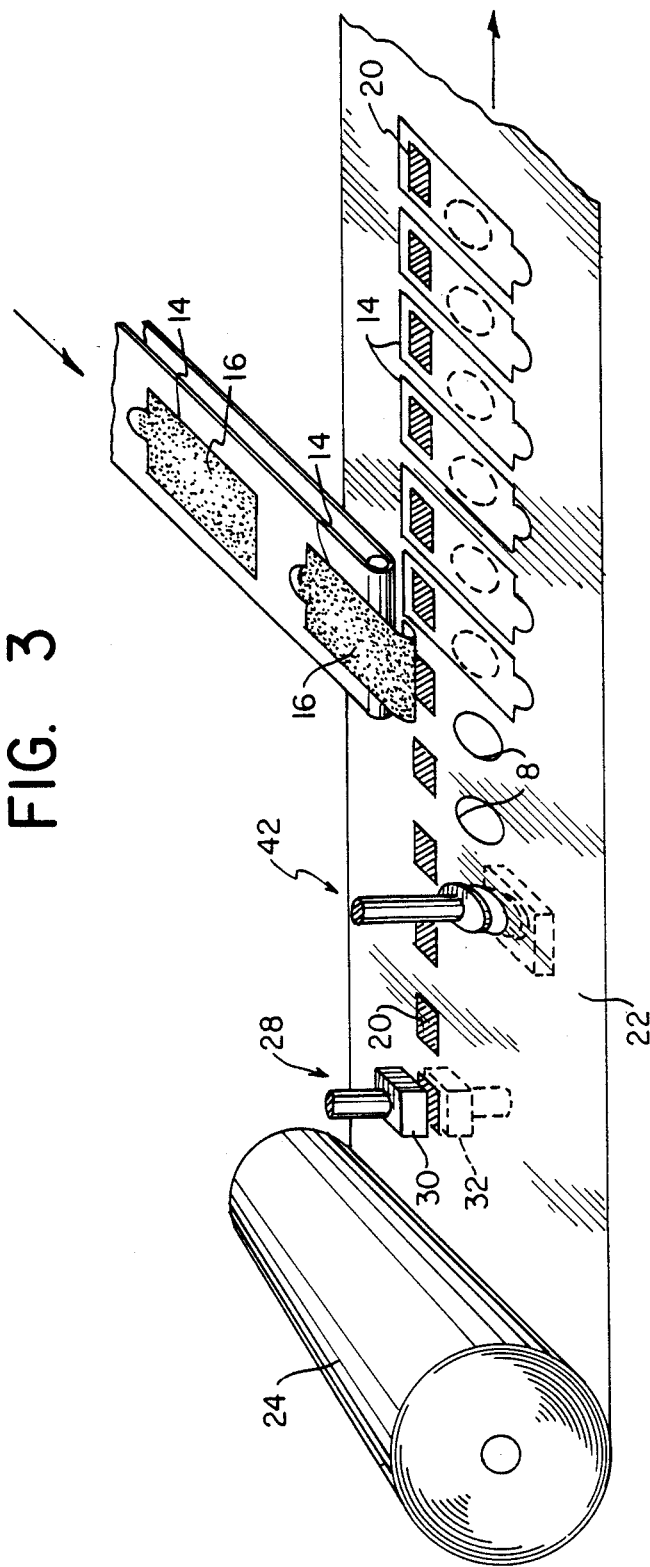

RE-SEALABLE LABEL FLAP

BACKGROUND OF THE INVENTION

The present invention relates generally to sealed containers which may be resealed after being opened. Such containers are commonly used to package sheet-like material which has been thoroughly wetted with a liquid prior to packaging. These containers are generally made from a thin liquid impervious material, such as rigid and/or semi-rigid thermoplastic and have an opening over which a label-flap is adhered. A label-flap is a strip of flexible or semi-rigid thermoplastic having on one side a pressure sensitive adhesive, which acts as a sealing cover for the package opening and also supporting the package label (on the other side). Upon peeling this label-flap, the opening provides access to the individual contents.

The present invention more specifically relates to the label-type resealable flap often used with such resealable containers and the means by which it is attached to the container's surface. These label-flaps generally have a portion at one edge which is fixed to the container body using a stronger bond then that provided by the pressure sensitive adhesive to create a "stop point" and prevent the user from removing the label-flap completely. If the label-flap were to be completely removed it would be difficult for the user to relocate the label-flap in the correct closing position. Without correct re-closure of the opening the remaining contents of the container would be vulnerable to contamination thereby substantially reducing the product's shelf-life.

In the field of resealable labels, there are various methods currently used for affixing the label to the package body for creating a stop point. One method includes the procedure of dye-cutting the label-flap so that upon opening the package the label-flap will "hinge" in between the dye-cuts and remain adhered to the package. The die-cuts create a stop point which prevents complete removal of the label-flap. This method is described in U.S. Pat. No. 4,552,269 to Chang. Another method uses heat to heat-seal the label to the package thus providing the stop point. Yet another method provides a label-flap stop point by applying a second label with a stronger adhesion over the "hinge" end of the label-flap.

Corona treating techniques have been used in many industries to improve surface adhesion characteristics of two given materials by creating an oxidized "reactive" surfaceto at least one of these materials. U.S. Pat. No. 3,391,044 to Kaghan et al. discloses a method for treating the surface of plastic material such as thermoplastic films and foils with a corona discharge to improve adhesive anchoring characteristics. Prior art corona treating methods such as the one disclosed in U.S. Pat. No. 3,391,044, treat entire surfaces of material, such as one surface of an entire roll of thermoplastic webbing.

The present invention provides means for applying corona treatment to a selected zone of a package body creating an area where a label-flap will adhere forming a substantially increased bond compared to untreated areas of the package body. This treated area provides a unique method for developing a functional label-flap stop point.

It is an object of the present invention to provide a low cost and simple method of developing a functional stop point for label-flaps used in resealable packages.

SUMMARY OF THE INVENTION

In accordance with the invention, a corona treatment is applied to a pre-selected zone of a package body which increases the adhesive anchoring characteristics of the package material at those selected zones only, to provide a label-flap stopping point.

BRIEF DESCRIPTION OF THE DRAWINGS

FIG. 3 is a flow schematic illustrating the process of the present invention for employing zone corona treatment on a selected area of the package body to create a stop point for pressure sensitive resealable labels.

DETAILED DESCRIPTION OF THE PREFERRED EMBODIMENT

Figure 1:
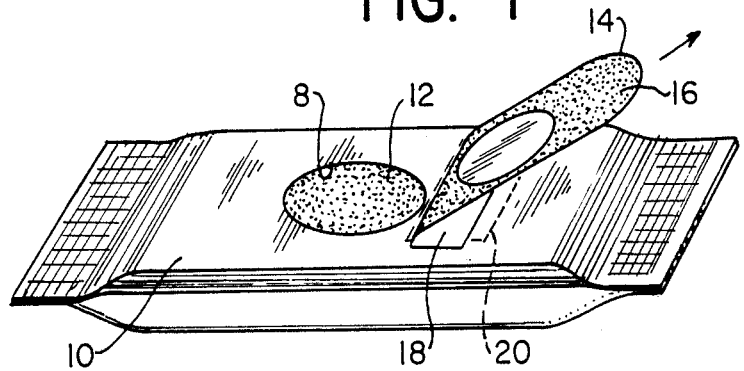
FIG. 1 is a perspective view of a flexible resealable package in the open position showing the selected zone which has been corona treated.
Figure 2:
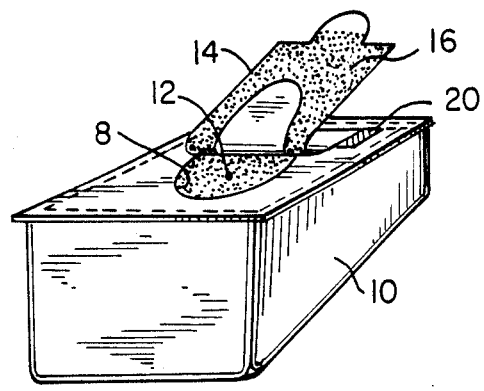
FIG. 2 is a perspective view of a resealable semi-rigid package in the open position showing the selected zone which has been corona treated.

FIG. 1 shows a conventional resealable dispenser-container comprising a main container body 10 made of liquid impervious flexible thermoplastic material such as polypropylene/EVA or polypropylene/polyester/EVA and having an opening 12 from which individual sheet-like contents may be removed, and a label-flap 14 positioned to cover the opening 12. Other materials which are usable for with the present invention are: unsupported P.V.C., polystyrene, polyethylene, metallized PET, PP/EVA and polyethylene.

One side of the label-flap 14 is coated with a pressure sensitive adhesive 16 whose adhesive characteristics remain functional after repeating label-flap separation. A label portion 18 of label-flap 14 is more securely attached to the main body 10 then the bond provided for the remaining label-flap 14 by the pressure sensitive adhesive in order to make it difficult during the normal opening and closing of the package to completely detach the label-flap 14 from the main package body 10. Package portion 20 is the region of the package body surface which corresponds in position to label-flap portion 18 of label-flap 14.

. According to the present invention the surface of the package portion 20 of the package body material is treated with a corona discharge before the label-flap 14 with its adhesive 16 is attached to the surface of the main body 10. The corona treatment provides an adhesion enhanced area of main body 10 having an oxidized "reactive" surface. The adhesive 16 of label flap 14 will bond more strongly with the corona treated package portion 20 then with the untreated areas of the main body 10. Package portion 20 serves as a functional "stop point" when peeling the package open. The corona treatment is restricted to package portion 20 in FIG. 1.

Table 1 below, lists test results concerning the adhesive anchoring characteristics of a corona treated zone and a non-treated zone. The test was performed using a standard polypropylene/polyester/polyethylene copolymer structure as the package body. Pre-selected surface areas of this package body were exposed in a corona discharge of 500 watts output for four different exposure times. The pressure sensitive label-flaps were then adhered to the package body covering both untreated and corona treated areas. PEEL strength values of the untreated areas and STOP strength values of the corona treated areas are measured in (grams) after 12 hours aging. The results are shown below:

TABLE 1

| ZONE TREATMENT CONDITION | RESULTS | |
|---|---|---|
| Corona Treatment Exposure Time (in seconds) 500 Watts output | Peel Strength | Stop Strength |
| 0.5 | 650 | 1,300 |
| 1.0 | 650 | 1,300 |
| 2.5 | 650 | 1,300 |

The results of the experiment outlined in Table 1 show higher STOP strength values over corresponding PEEL strength values. This result is expected due to the thermoplastic surface treated with a corona discharge providing a "reactive" surface and in turn allowing for a stronger bond between this treated surface and the pressure sensitive adhesive employed to attach the label-flap to the package. The remaining untreated surfaces of the plastic label-flap and a plastic package body will remain comparatively non-reactive and will therefore provide a weaker bond with the same pressure sensitive adhesive. This untreated surface provides the necessary conditions for the repeated removal and re-adhering of the label cover to occur with satisfactory long term re-sealing results.

According to Table 1, the adhesion of the two samples in the corona-treated zone held until 1,300 grams were applied, twelve hours after the 2.5 seconds corona treatment. The nontreated area peeled at 650 grams which is half the strength of the treated area. The greater the difference between these two adhesion tolerances, the greater the "stop point" effectiveness.

Table 2 shown below are test results following the same conditions as above except that the PEEL strength and the STOP strength values (in grams) are measured after one week of adhesive aging.

TABLE 2

| ZONE TREATMENT CONDITION | RESULTS | |
|---|---|---|
| Corona Treatment Exposure Time (in seconds) 500 watts output | Peel Strength | Stop Strength |
| 0.5 | 800 | 1,850 |
| 1.0 | 800 | 2,000 |
| 2.5 | 900 | 2,450 |
| 5.0 | 800 | 2,500 |

Table 2 shows that the STOP strength values have increased substantially over the aging period of one week while the PEEL strength values increased only slightly. As the pressure sensitive adhesive ages, it will "cure" in the corona treated area thereby strengthening the bond with the label-flap in that area. The adhesive will not cure as substantially into the non-treated areas and will therefore not increase the bonds in those areas. A benefit of using this zone controlled corona discharge process is that only one pressure sensitive adhesive layer is required to provide both a portion of a label-flap which is easily and repeatedly removable from a package body surface and a remaining portion of the label-flap which is very difficult to separate from the package body.

FIG. 3 shows a flow chart diagram of a preferred process according to the invention for preparing label-flaps and applying them to package body material to be then fed into a conventional packaging process for further conversion into dispenser-resealable type flexible containers, for example, according to the process described in U.S. Pat. No. 4,420,2802 to Nakamura.

A continous supply of package body material 22 (such as thermoplastic) is fed between the electrodes 30 and 32 of a corona discharge machine 28. The electrodes 30 and 32 are shaped to the desired shape of the zone (package portion 20) on the package body 10 which is to be corona treated. In FIG. 3, a rectangular electrode shape is shown. These electrodes 30 and 32 are positioned one above the other so that the corona discharged between them will be confined to the shape of the electrodes. The electrodes are separated by a distance 34. This distance 34 must be small for the corona to efficiently and effectively create the necessary reactive surface in the desired shape on the package body 10. The package body material 22 is fed from the supply roll 24 to the corona treatment machine 28 such that the desired portion 20 of the package body 10 which is to be corona treated lies exactly between the two electrodes 30 and 32 when the corona machine 28 is activated for the pre-determined amount of time as controlled by a controlling means (not shown). The package body material with its desired portion 20 corona treated then proceeds to a conventional perforation machine 42 which cuts an oval shape 8 (or similar) such that the contents of the final package are easily accessible. Label-flaps 14 having a preapplied pressure sensitive layer 16 (through conventional means not shown) are attached to the main body material 22 at predetermined locations. Each oval cut-out 8 and adjacent corona treated area 20 are individually covered by adhered label-flaps 14. The package body material 22 proceeds to the remaining conventional packaging process (not shown).

Figure 4:
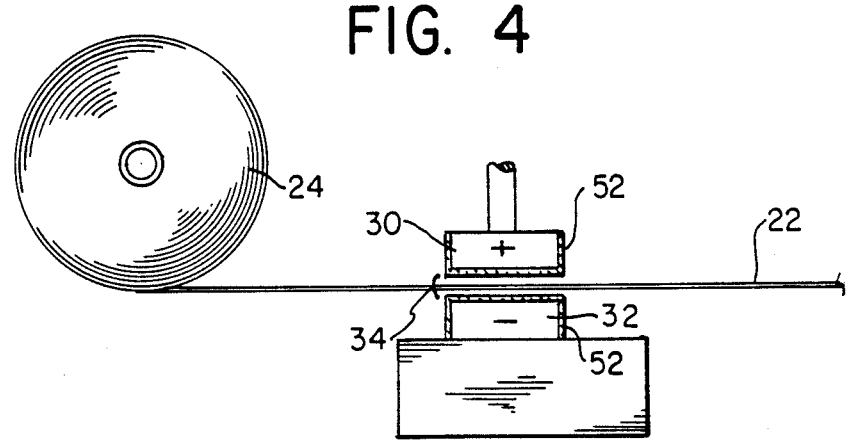
FIG. 4 is a side view of one embodiment of the corona treatment step in the process of the present invention shown in FIG. 3.

FIG. 4 shows a side view relationship of the two corona treatment electrodes 30 and 32 and the packaging film 22. In the preferred embodiment of the present invention the electrodes are approximately 1/16 of an inch from each other. Both electrodes are coated with an insulator 52 such as ceramic to prevent arc burns on the surface of the packaging material.

The amount of time the electrodes are energized is dependent on the thickness and composition of the particular package material used. In the preferred embodiment the electrodes are activated for 1/10 th second intervals to provide an acceptable level of corona treatment with minimal film distortion.

What is claimed is:

1. A package having an opening and a resealable label flap for sealing the opening, said package comprising:

an enclosure portion for housing contents, said enclosure having a first sealing surface;

an opening in said enclosure for accessing said contents;

a label flap having a second sealing surface for selectively sealing said enclosure portion by covering said opening;

a roughened area located on said first or second sealing surface, said area formed by a corona discharge and providing a surface capable of bonding to a pressure sensitive, non-thermal adhesive more strongly than the area of said sealing surface not treated by corona discharge; and an adhesive applied between said label flap and said enclosure for adhering said first sealing surface to said second sealing surface such that said opening can be sealed by said label flap, said flap being secured to said enclosure by the stronger bond created within said roughened area of said sealing surface, said roughened area, with said adhesive, functioning as a label stop.

2. The package according to claim 1 wherein said adhesion enhanced area is located on both of said sealing surfaces.

3. The package according to claim 2 wherein said adhesive is a pressure sensitive type.

4. The package according to claim 3 wherein said adhesive is already applied to said sealing surface of said label flap prior to securement of said label flap to said sealing surface of said enclosure portion.

5. The package according to claim 1 further comprising a cover sheet located within said opening for preventing contamination of said contents by said adhesive wherein said cover sheet is adhered to said second sealing surface by said adhesive.

* * * * *